United States Patent [19]

Odone

[11] Patent Number: 4,533,226

[45] Date of Patent: Aug. 6, 1985

[54] STILL OR MOTION PICTURE CAMERA

[75] Inventor: Giovanni Odone, CH-Saint-Sulpice, Switzerland

[73] Assignee: Robert Bosch GmbH, Stuttgart, Fed. Rep. of Germany

[21] Appl. No.: 471,635

[22] Filed: Mar. 3, 1983

[30] Foreign Application Priority Data

Mar. 30, 1982 [DE] Fed. Rep. of Germany ....... 3211659
Jul. 13, 1982 [DE] Fed. Rep. of Germany ....... 3226118
Aug. 30, 1982 [DE] Fed. Rep. of Germany ....... 3232192

[51] Int. Cl.³ .............................................. G03B 7/099
[52] U.S. Cl. ..................................... 354/403; 354/478
[58] Field of Search ............... 354/403, 409, 476, 478, 354/152, 155, 195, 199–201, 219, 224, 225; 352/140; 356/1, 8

[56] References Cited

U.S. PATENT DOCUMENTS 3,836,919  9/1974  Matsumoto et al. ................. 354/403
4,215,924  8/1980  Matsumoto ......................... 354/478

FOREIGN PATENT DOCUMENTS 2936104  3/1981  Fed. Rep. of Germany ...... 354/403
0006345  1/1980  Japan ................................. 354/201
0106425  8/1980  Japan ................................. 354/195

Primary Examiner—William B. Perkey
Attorney, Agent, or Firm—Michael J. Striker

[57] ABSTRACT

Disclosed is a single lens reflex still or motion picture camera of the type having an active infrared rangefinder. In order to obtain a compact construction of the camera, the receiver of the rangefinder includes an infrared image plate which is located in close proximity to the viewfinder plane and includes a small-area infrared light reflecting surface embedded in the body of the infrared image plate and being inclined at an angle thereto, so as to direct infrared light rays to an infrared sensor which adjoins a lateral end face of the infrared image plate.

20 Claims, 10 Drawing Figures

STILL OR MOTION PICTURE CAMERA

BACKGROUND OF THE INVENTION

The present invention relates in general to a still or motion picture camera of the type having an objective cooperating with a reflex viewfinder which includes a deflection member for light rays passing through the objective, and an active infrared rangefinder which includes a receiver provided with an infrared light sensing element such as a photodiode and an infrared light reflecting mirror arranged in the path of light rays passing through the objective and the viewfinder, and a rangefinder transmitter transmitting infrared light onto a selected object to be photographed, the infrared image in the light rays passing through the objective and the viewfinder being focussed on the infrared image plate.

In a known photographic camera of the aforedescribed kind (DE-OS No. 29 36 104), the mirror surface for reflecting infrared rays is arranged between the light rays deflecting member in the form of a swivelling mirror and the image plane of the viewfinder. The viewfinder image is focussed on a ground glass screen located in the viewfinder image plane and converted via a pentagonal prism into an upright image visible in the viewfinder eyepiece. The mirror surface which reflects infrared light is permeable to the remaining light spectrum, screens the infrared image out of the viewfinder light beam, and focusses this infrared image onto the infrared sensing element, such a photodiode.

In many cases, particularly in compact, small-format mirror reflex cameras, the free space between the ground glass screen in the viewfinder image plane and the swivelling or swingable mirror is frequently insufficient for accommodating the additional infrared light reflecting mirror surface.

A space-saving arrangement of the infrared light reflecting mirror surface has been already devised in which a separate infrared light mirror is provided in proximity to the light reflecting swingable mirror of the camera, and the photodiode is located on the ground glass screen outside the field of the viewfinder image. The reflecting mirror of the camera in this case must be transparent to infrared light, whereas the infrared light reflecting mirror is inclined at an angle over the reflecting mirror so as to reflect the infrared image on the photodiode provided on the ground glass screen.

It has also been devised to provide, instead of the two mirrors, a single prismatic mirror whose front side reflects visible light but is transparent to infrared light, and whose back side reflects the infrared light. The reflection of the infrared light in the glass material of the prismatic mirror contributes to deviation of the infrared light, and consequently the deflection angle of the infrared mirror surface to the reflecting mirror surface for visible light is larger than in the preceding example, when two separate mirrors are employed.

Both of the above examples of a space-saving arrangement of the infrared light reflecting mirror surfaces have the disadvantage that, together with the reflecting mirror during the film exposure, the infrared light reflecting mirror must also be swung out. The inertia of the latter swingable arrangement of reflecting mirrors, however, is substantially larger than the inertia of the mirror in a normal single mirror reflect camera, and the speed of movement of such mirror arrangement is slower than is desirable.

SUMMARY OF THE INVENTION

It is therefore a general object of the present invention to overcome the aforementioned disadvantages.

More particularly, it is an object of the invention to provide such an arrangement of the infrared mirror surface which does not require any substantial space for its installation in the viewfinder light beam between the beam deviating member and the viewfinder image plane.

Another object of this invention is to provide such an improved camera of the aforedescribed type which has a reduced structural height and reduced overall volume.

An additional object of the invention is to provide an improved reflex camera of the here described kind in which the movement and inertia of the swingable mirror, which at any rate are weak points of single lens reflex cameras, are not affected in a negative sense.

In keeping with these objects and others which will become apparent hereafter, one feature of the invention resides, in a reflex camera having an active or infrared light rangefinder, in the provision of an infrared image plate arranged in close proximity and parallel to the viewfinder image plane, the infrared light reflecting mirror surface being located within the infrared image plate and being inclined at an acute angle $\alpha$ relative thereto, and said infrared sensor being arranged in a marginal zone of said infrared image plate opposite said infrared light reflecting surface.

In one embodiment of this invention, the rectangular infrared image plate is an elongated plate divided along an inclined separation plane directed transversely to the longer side of the plate, the angle of inclination of the separation plane corresponding to the inclination angle of the infrared light reflecting mirror, the latter being formed on one inclined surface, whereupon the two divided parts are united by means of a light-transparent glue.

In another embodiment of this invention, the end face of the infrared image plate opposite the infrared light reflecting mirror has an arcuate shape to focus the reflected infrared image on the sensing element. The arcuate rim of the end face of the infrared image plate is provided with a reflecting coating so as to define the path of infrared rays between the reflecting mirror surface and the infrared-sensitive element. In this manner, the infrared rays are always maintained within the confines of the infrared image plate, inasmuch as a total reflection occurs at both ends of the plate. The intensity of the infrared light rays, due to the total multiple reflections does not change, and the rays propagate without attenuation to the arcuate reflecting end face. The only attenuation occurs due to the effect of the inclined infrared light reflecting mirror surface because light reflected from the other end face of the plate cannot pass through this mirror surface and consequently cannot reach the photodiode, or other infrared light sensing element, at the opposite end face. When the range of the object is large, the infrared image is indeed close to the end of the mirror, and at least half of the infrared light rays reflected from the coated end face of the plate reach the photodiode. In addition, the rays propagate statistically within the entire thickness of the infrared image plate. When the ratio between the height of the infrared light reflecting mirror surface and the height or thickness of the infrared image plate amounts to 1 to 5, the losses in the light flow are only 10%. When the range of the object is short and outside the balanced condition of the rangemeter, the light losses will double. Nevertheless, the remaining portion is sufficient for complete activation of the infrared sensing element.

In another advantageous embodiment of this invention, the infrared light reflecting mirror surface is 0.1 mm wide and 0.2 mm long. The resulting small-surface infrared light reflecting mirror is applicable in rangefinders which are coupled to focussing rings on the objective by means of a synchronous drive, whereby the rangefinder and the objective at the beginning of each range measurement can be set also to the shortest focal length of the objective. From this starting position, the drive adjusts the focussing ring toward the longer range settings until the infrared image reaches the rim of the infrared light reflecting mirror surface. At this point, the infrared light sensing element detects the reflected infrared rays and disconnects the synchronous drive. Due to the fact that it is sufficient to utilize only the marginal portion of the infrared light reflecting mirror surface, the latter may cover an extremely small area corresponding to the aforementioned dimensions. The outline of the infrared light reflecting mirror surface can be arranged either parallel to the direction of displacement of the infrared image, or it can be perpendicular thereto. In the former case, the rim of the mirror surface, which coincides with the inclined separation plane of the infrared plate, detects the position of the infrared image, whereas in the latter case it is the transverse or horizontally directed rim which performs the detecting function.

In a modification of this invention, the infrared light reflecting mirror surface has a width between 1/10 and 2/10 mm measured in the direction of inclination of the separation plane, and the transverse size of the surface has a dimension $l = f \cdot b / p_o$, wherein f is the focal length of the objective, b is the spacing between the optical axis of the transmitted beam of infrared light rays and the axis of the objective, and $p_o$ is a predetermined, shortest picture-taking distance between an object and the objective. This modification is advantageous when the rangefinder and the camera follow the changing position of the object. In this case, the infrared mirror surface must be of sufficient length in order to reflect infrared light rays onto the light sensitive element even when the rangefinder is set to its largest range and the object is situated in the shortest picture-taking distance.

In the preferred embodiment of this invention, the infrared image plate is located immediately in the viewfinder image plane, preferably between the light deflecting member and the viewfinder image plane. This arrangement enables the formation of a sharp image approximately in the image plane of the viewfinder. When the rangefinder is set to its balanced condition, the objective is sharply focussed on the object to be photographed.

Alternatively, the infrared image plate can be arranged between the viewfinder image plane and the light deflecting member at a distance from the viewfinder image plane, and the surface of the light reflecting member facing the objective is transmissive to infrared light but reflects visible light and cooperates with a parallel reflecting surface or infrared light. This arrangement is advantageous in the case when for reasons of construction it is desirable to install the infrared image plate in a small distance from the viewfinder image plane. The provision of a twofold reflecting mirror creates the possibility to arrange the infrared image plate at such a distance from the viewfinder image plane which is a multiple of the thickness of the mirror. Even in this embodiment it is achieved that, when the rangefinder is set in its balanced condition, the objective is sharply focussed on the object.

In a preferred embodiment of the above modification, the rangefinder controls a motor-driven focus adjuster which is deactivated upon reaching a balance in the rangefinder, and the control circuit for performing this function is designed such that upon reaching the balanced condition of the rangefinder the objective is additionally adjusted to a position corresponding to the distance of the infrared image plate from the viewfinder image plane. By virtue of this arrangement, it is possible to install the infrared image plate at any desired distance from the viewfinder image plane. Nevertheless, in practice it is desirable to keep this additional adjustment of the objective as small as possible, and consequently the spacing between the infrared image plate and the viewfinder image plane is held as small as possible. It is true that, when the rangefinder is adjusted to its balanced condition, the infrared image is sharply focussed on the infrared image plate, but this condition need not be true as regards the visible image in the viewfinder and in the film plane of the camera. The latter condition, as mentioned above, is achievable only by a constant focussing correction on the objective, made in response to the balanced condition of the rangefinder. It is necessary, however, to preset a new correction value for each type of objective.

In another embodiment of this invention, used in a single lens reflex camera having a pentagonal prism between the viewfinder eyepiece and the viewfinder image plane, the lower front end side of the prism remote from the eyepiece is transmissive to infrared light and is connected to a plane-convex lens provided with an infrared light reflecting coating and having a curvature which directs infrared light to an infrared light sensor located at the opposite end face of the prism. This embodiment also results in a single lens reflex camera having a compact construction and a relatively low inertial moment of its swingable mirror.

In a modification of this embodiment, the infrared image plate is spaced apart from the surface of the viewfinder image plate remote from the light deflecting member at a distance at which the visible image and the infrared image are simultaneously sharply focussed both on the viewfinder image plate and on the infrared image plate. In this manner, the individual selection of the correction value for different types of objectives can be dispensed with. Due to the decrease of the refraction index of glass in response to increasing wavelength of light, the infrared image plane in this arrangement is spaced at a greater distance than the viewfinder image plate. By suitable selection of the geometrical arrangement of the infrared image plate relative to the viewfinder image plate, the above additional shift of the two image planes is compensated, so that at the same objective setting both the infrared image and the viewfinder image are simultaneously sharply focussed. The geometry of spacing between the surface of the infrared image plate facing the viewfinder image plate and the ground or mat surface of the viewfinder plate is preferably on the order of 1/10 mm.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
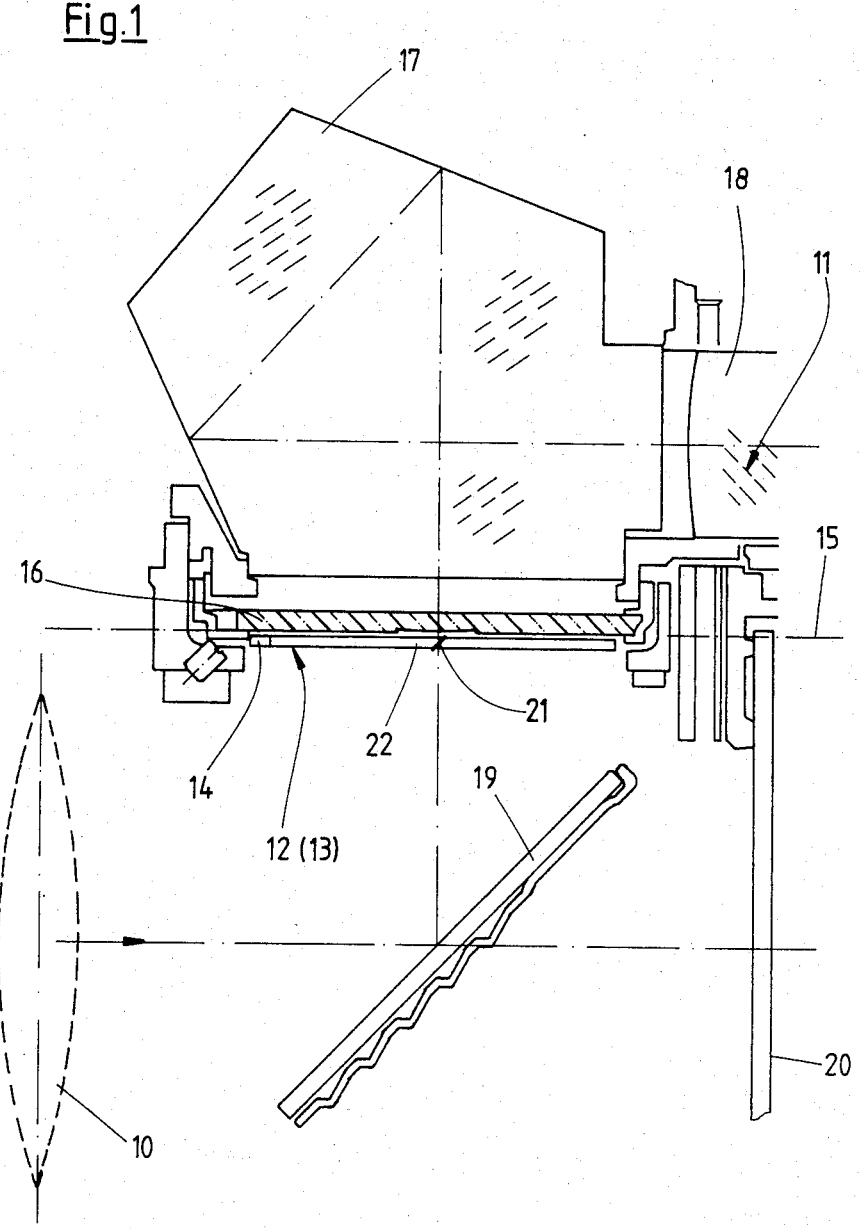
FIG. 1 is a schematic sectional side view of part of a single lens reflex camera according to this invention.

Referring firstly to FIG. 1, which illustrates a cut away part of an embodiment of a reflex camera including an objective 10 indicated by dashed lines, a reflex viewfinder 11 and an active infrared rangefinder 12 of which the receiver 13 is partially illustrated and the transmitter 12' is indicated schematically. The construction and operation of an infrared rangefinder of this type is known for example from the DE-OS No. 29 36 104.

This known infrared rangefinder includes an infrared transmitter 12 and receiver. The transmitter emits a bundle of infrared light rays indicated by a dash-and-dot line. This bundle or beam of rays is generated by means of a laser diode 12, for example, and transmitted through a projecting objective 12. The infrared light beam impinges upon the object aimed at by the viewfinder and produces thereon an infrared image which in turn is received by the objective 10 and projected on an infrared light sensitive element 14, such as a photodiode. The depth of field of the objective must be set according to the distance of the object relative to the camera in order to produce a sharply focussed image. For this purpose, the objective 10 is provided in conventional manner with a distance setting device, such as an adjustable focussing ring provided with a depth-of-focus scale. A driving mechanism couples the light source of the infrared transmitter with the distance setting device in such a manner that, upon displacement of the objective in the direction of its optical axis, the transmitted infrared light beam is angularly displaced relative to the optical axis of the objective. This driving mechanism adjusts the objective and the inclination of the transmitted light beam until the received infrared image projected by the objective appears on the infrared light sensitive element 14. At this instant, the rangefinder is in balanced condition or, in other words, its setting coincides with the true distance of the object from the camera and the driving mechanism is deactivated. The objective is exactly focussed on the object the picture of which is to be taken.

The reflex viewfinder 11 in the single lens camera includes, as known, a ground glass or mat screen 16 arranged in the viewfinder image plane 15 indicated by a dash-and-dot line. The viewfinder further includes a pentagonal prism 17 and a viewfinder eyepiece 18. The light reflected from the object to be photographed and passing through the objective 10 of the camera is first reflected in a known manner by a swingable mirror 19, to produce on the ground glass screen 16 of the viewfinder a sidewise inverted image of the object which by means of the prism 16 is restored and observed in correct orientation by the user through the eyepiece 18 of the viewfinder. In taking the picture of the object, the swingable mirror 19 is swung up in the known manner, so as to allow free passage of the light rays from the objective 10 onto the film plane 20 where the sharply focussed image of the object is exposed onto the film.

In order to extract the infrared image from the incoming beam of light rays, an infrared light reflecting mirror surface 21 is provided in the path of reflected light beam in the viewfinder 11. The orientation of the infrared mirror surface is such as to deflect the incoming portion of infrared light against the infrared sensor 14, which in this embodiment has the form of a photodiode.

Figure 2:
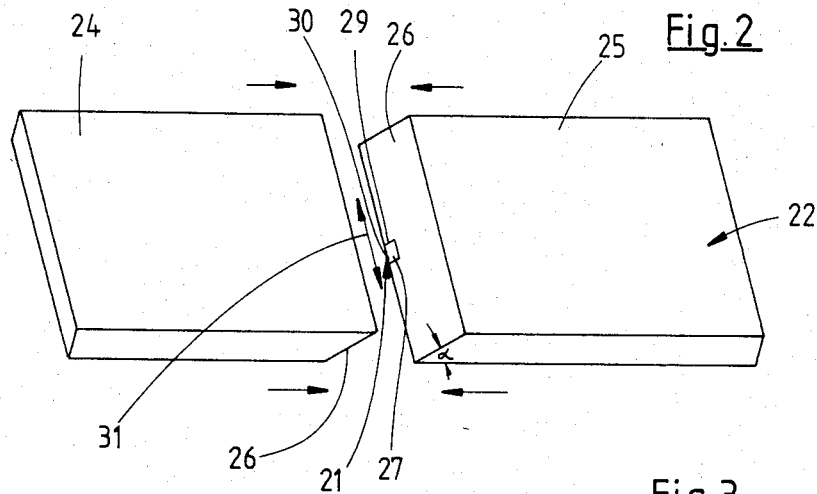
FIG. 2 is an exploded perspective top view of an infrared image screen or plate in the camera of FIG. 1.
Figure 3:
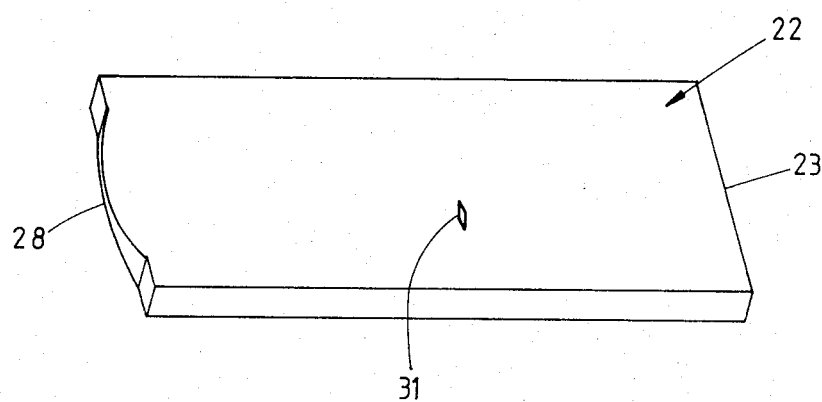
FIG. 3 is a perspective view of the infrared image screen of FIG. 2 in its assembled condition.
Figure 4:
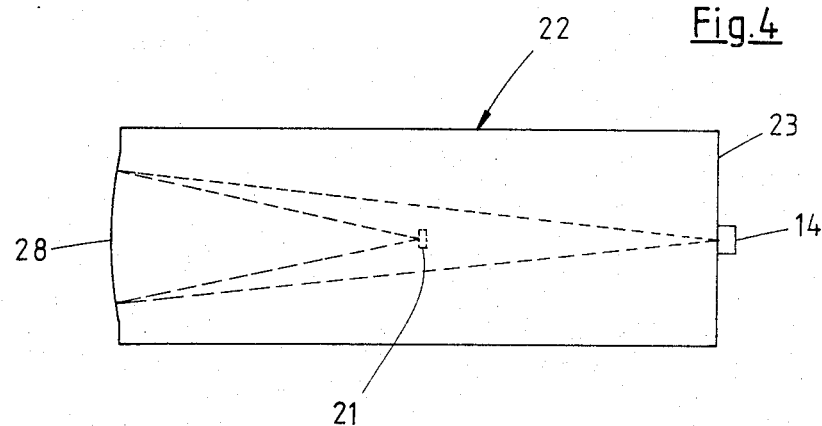
FIG. 4 is a top view of the infrared image screen of FIG. 3 with indicated paths of infrared light rays.

As seen from FIGS. 2-4, the infrared light reflecting mirror surface 21 is embedded in an infrared image plate or screen 22 which in turn is arranged close to the viewfinder image plane 15. The infrared image screen 22 extends parallel to the ground glass plate 16 of the viewfinder, and the infrared image mirror surface 21 is inclined relative to the viewfinder image plane 15. In the example according to FIG. 2, the inclination angle α of the infrared mirror surface 21 is 45°. The infrared light sensing element 14, shown in FIG. 1 on the left-hand side and in FIGS. 2-4 on the right-hand side of the infrared image plate 22, adjoins the end face 23 of the infrared image screen 22. The infrared image screen or plate 22 in this embodiment is composed of two parts 24 and 25 connected to each other along an inclined separation plate which is directed transversely to the longitudinal direction of the infrared image screen 22 and forms the angle α (=45°) with the surface of the plate facing the swingable mirror. The inclined contact surface 26 of the screen part 25 is formed approximately midway of the lower edge thereof with a surface portion 27 which reflects infrared light rays only. Thereupon the two halves 24 and 25 of screen 22 are joined together along the inclined contact surface 26 with an optically transmissive glue. The completed infrared screen 22, with the enclosed infrared light reflecting mirror surface 21, is depicted in FIGS. 3 and 4. The narrow end face 28 opposite the other end face 23 provided with the infrared sensor 14, has an arcuate configuration and is provided with infrared light reflecting coating. The curvature of the reflecting end face 28 is such as to redirect reflected infrared light from the mirror surface 21 towards the infrared light sensor 14 at the other end face 23. In this embodiment, the thickness of the infrared image plate or screen 22 amounts to about 1 mm. The infrared mirror surface 21 is of extremely small area and its shorter lateral sides are about 1/10 to 2/10 mm long. The application of such an extremely small-size infrared mirror surface 21 is made possible only when the rangefinder 12 is used for measuring the distance of a non-movable object and the drive of the rangefinder is controlled in such a manner that at the beginning of each range measurement the adjustment of the objective and of the rangefinder is set for the shortest depth of field of the camera. From this starting position, the drive adjusts the distance setting of the objective 10 and simultaneously the direction of the infrared light beam transmitted from the active rangefinder towards longer distances, until the received infrared image overlaps the rim 29 of the infrared mirror surface 21. At this moment, the infrared sensor 14 receives a reflected part of the infrared light and switches the drive off. In the above explanation, it is assumed that the displacement of the focussed infrared image on the screen of the rangefinder 12 occurs parallel to the longitudinal dimension of the infrared mirror surface 21, as indicated by the double arrow in FIG. 2. Alternatively, it is also possible to move the projected infrared image in transverse direction, that means perpendicularly to the longer side of the mirror surface 21, and in this case the stoppage of the drive occurs upon overlapping of the longer side 30 of the mirror surface 21.

If it is desired that the objective adjustment be synchronized with range variations of the object to be taken, as is the case frequently in cinematographic cameras, then it is necessary to increase the length of the infrared light reflecting surface 21, that means in the direction of arrows 31 in FIG. 2. The longitudinal dimension of the mirror surface 21 extends parallel to the direction of displacement of the infrared image on the plate 22. The length 1 of the infrared reflecting surface 21 is computed according to the formula $$l = f \cdot b / p_o,$$

wherein f is the depth of focus of the objective 10, b is the spacing between the optical centers of the objective and of the infrared transmitter, and $p_o$ is the minimum taking distance permissible by the objective of the camera.

In the embodiment according to FIGS. 1–4, the infrared picture screen 22 is situated immediately in the image plane 15 of the viewfinder, so that upon correct adjustment the depth of field of the objective both the visible image and the infrared image are sharply focussed in respective image planes, and the rangefinder is in its balanced condition in which the drive is deactivated.

Figure 5:
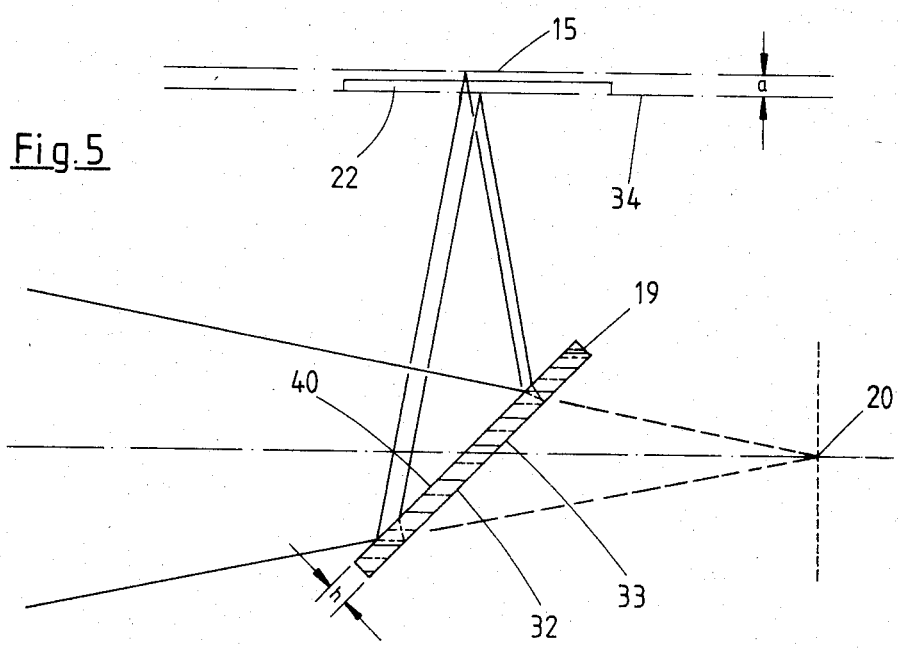
FIG. 5 is a schematic side view of a part of a second embodiment of the camera of this invention with indicated path of infrared light rays in the viewfinder.
Figure 6:
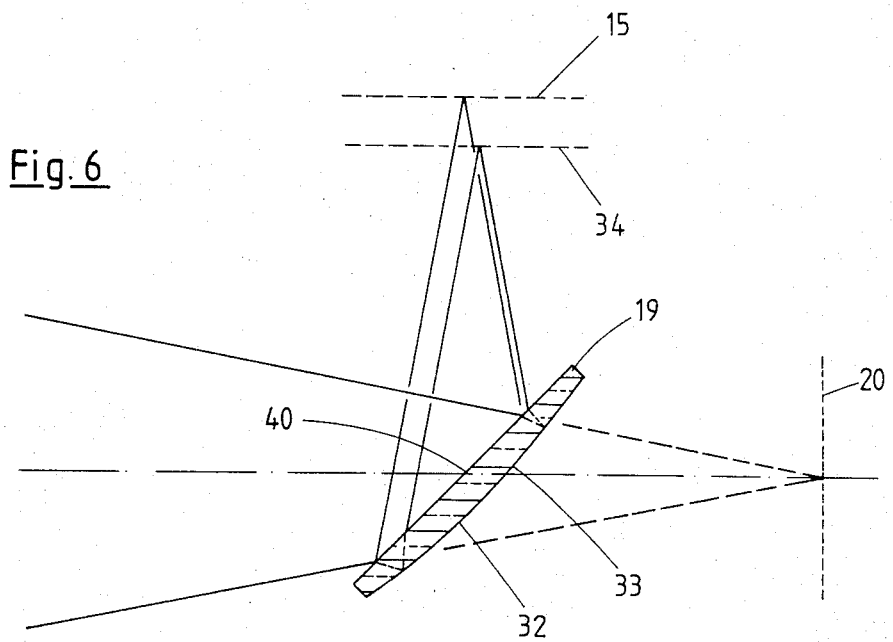
FIG. 6 is a schematic side view of a third embodiment of the camera of this invention with indicated path of infrared light rays.

FIGS. 5 and 6 show respectively embodiments of the camera of this invention, in which for design reasons the infrared image screen 22 is spaced apart from the image plane 15 of the viewfinder. The overall arrangement of the infrared image screen 22, similarly as in the embodiment according to FIG. 1, is between the viewfinder image plane 15 and the swingable mirror 19. The swingable mirror 19 in this case is provided, in addition to the front reflecting surface 40, with a rear reflecting surface 32 formed on the rear side 33 of the mirror. In this design of the light reflecting mirror 19, the surface of the infrared image screen 22 facing the front reflecting surface 40 of mirror 19 is spaced from the viewfinder image plane 15 about a distance a computed from the following expression:

$$a = 2 \cdot h \cdot n,$$

wherein h is the thickness of the swingable reflecting mirror 19 and n is its refraction index. The lower surface of the infrared image screen 22 facing the mirror 19 coincides with the lower edge of the inclined separation plane 26 and with the lower side of the infrared reflecting surface 21, as illustrated in FIG. 2. Also in this embodiment, the setting drive is deenergized as soon as the rangefinder is in its balanced condition and the setting of the objective and of the angle of the transmitted infrared light is completed, so that both the visible image in the viewfinder plane 15 and the infrared image in the infrared image plane 34 are sharply focussed.

In order to achieve a still larger spacing between the two image planes 15 and 34, the reflecting rear surface 32 of mirror 19 has a convex shape as illustrated in FIG. 6.

In all three embodiments of the single lens reflex camera of this invention, it is achieved that upon the balancing of the active rangefinder a sharply focussed visible image is formed in viewfinder plane 15 simultaneously with sharp focussing of the infrared image in the infrared plane 34. Such a simultaneous focussing of the two images is unnecessary. It is also feasible first to measure the range with respect to the selected position of the infrared image plane (in which the rim 30 of the infrared reflecting surface 21 is provided), whereas the objective is adjusted according to the setting of the rangefinder. Thereupon the adjusted position of the objective is additionally corrected about an amount corresponding to the distance between the two image planes 15 and 34. In this manner, a satisfactory sharp focus is adjusted for the infrared image during the range measurement, and thereafter an equally satisfactory focussing of the visible image is formed on the ground glass plate of the viewfinder and in the film plane.

To realize the sequential focus setting of the infrared image and of the visible image, the control circuit is modified so that, upon setting of the rangefinder into its balanced condition, the drive is activated for an additional adjustment of the objective towards larger distances about an amount corresponding to the spacing between the viewfinder image plane 15 and the infrared image plane 34. As before, the infrared image plane 34 extends again between the viewfinder plane 15 and the swingable reflex mirror 19. The additional amount of the distance adjustment of the objective is constant for a given type of objective. Nevertheless, due to the fact that a single lens reflex camera is suitable particularly for accommodating different exchangeable objectives each corrected in different manner for infrared radiation, the viewfinder image focussing plane 16 for visible images is more or less out of coincidence with the infrared image plane. As a consequence, each type of exchangeable objective necessitates its own correction value for displacing the objective over the setting reached at the balanced condition of the rangefinder. This small additional setting, which is characteristic for each individual objective, compensates the spacing between the image planes of the visible and infrared light.

Figure 7:
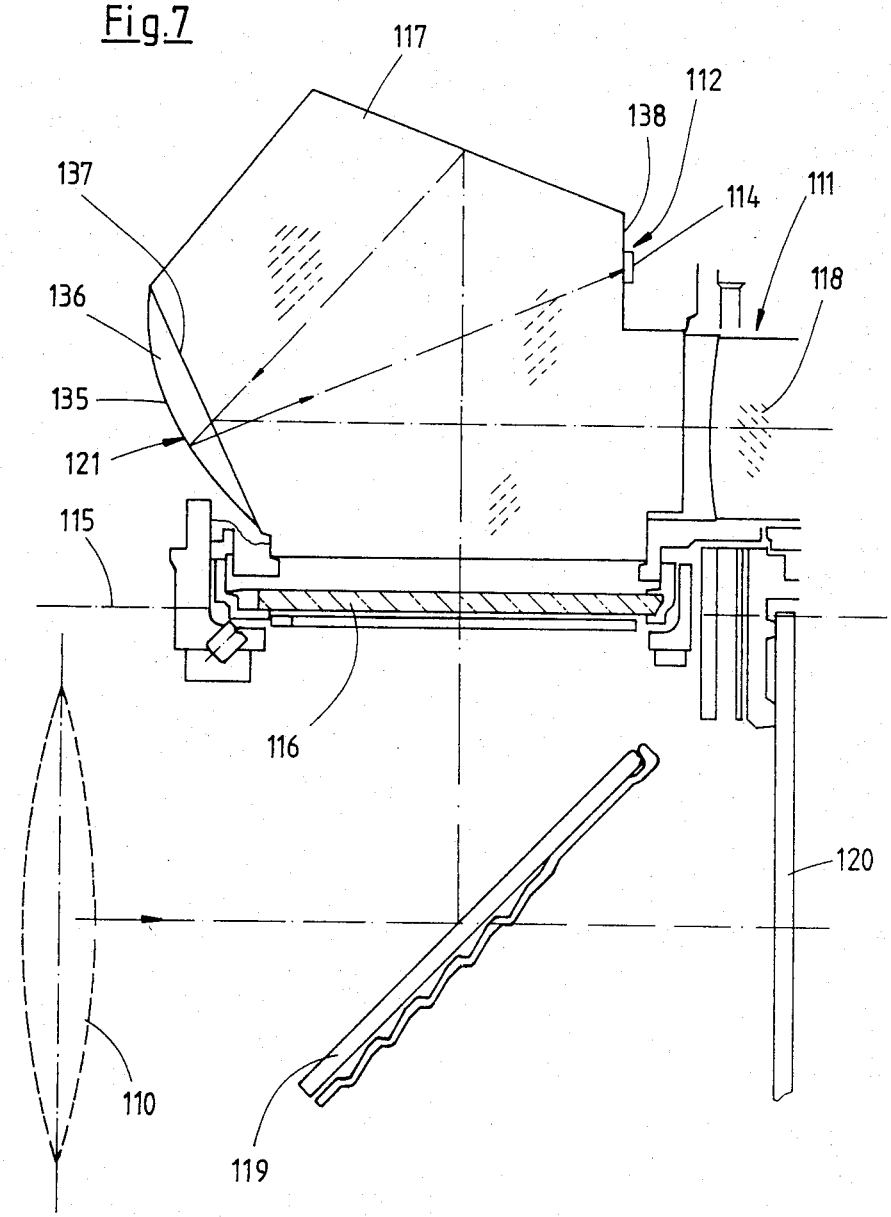
FIG. 7 is a schematic side view of a part of a fourth embodiment of the camera of this invention.

Reflex camera illustrated in FIG. 7 has a different arrangement of the infrared light reflecting mirror surface 21 when compared with the previously described examples. The remaining component parts of the camera according to FIG. 7 which correspond to the previous embodiments are denoted by like reference numerals, increased by 100.

This camera includes also an objective 110, a reflex viewfinder 111 and an active infrared rangefinder 112. In the path of reflected light rays, a ground glass plate 116 extends parallel to viewfinder image plane 115. When the objective 110 is correctly focussed, the swingable mirror 119 reflects a visible, sharply focussed image onto the mat plate 116. A pentagonal prism 117 of the viewfinder is again installed between the viewfinder plane 115 and the viewfinder eyepiece 118 to project in the latter an upright or restored image from the mat plate 116. Similarly as in the preceding examples, the receiver 112 of an active rangefinder includes an infrared light sensor 114, preferably in the form of a photodiode.

In order to separate the infrared light rays from the other wavelengths, the infrared light reflecting mirror surface 121 is in this embodiment formed on a concave inner surface 135 of a plan convex lens 136. The lens 136 adjoins a lower front side 137 of the prism 117. The front side 137 is transmissive to infrared light. The radius of curvature of the concave surface 135 is selected such that infrared rays reflected from the infrared mirror surface 121 are directed onto the infrared sensor 114 attached to a side 138 of the prism 117 facing the eyepiece 118.

Figure 8:
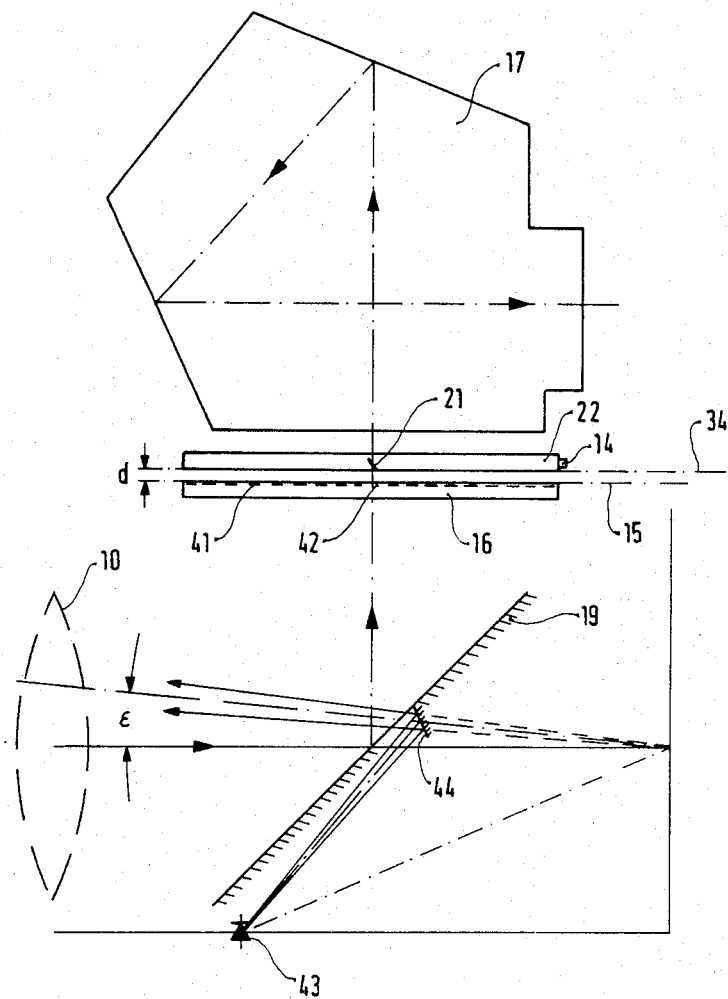
FIG. 8 shows a fifth embodiment of the camera of this invention.

Still another embodiment of the rangefinder in the single lens reflex camera of this invention is illustrated in FIG. 8. Component parts corresponding to those in the embodiment of FIG. 1 are indicated by like reference numerals.

The essential difference between this embodiment and the example of FIG. 1 is in the arrangement of the infrared image screen 22 extending opposite the side of the viewfinder mat screen 16 which is remote from the reflecting swingable mirror 19. In other words, in this embodiment the infrared image screen 22 is arranged between the mat screen 16 of the viewfinder and the pentagonal prism 17. The clearance d between the mat surface 41 of the ground glass plate 16, which coincides with the viewfinder image plane 15, and the facing surface of the infrared image screen 22 is selected such that, at equal objective settings, both the viewfinder image in the plane 15 and the infrared image in the plane 34 are sharply focussed. The clearance d is practically in the order of 1/10 mm. In this embodiment, the ground or mat surface 41 has at its center a discontinuity or non-mat area 42 opposite the infrared light reflecting mirror surface 21 on the image plane 22. The smooth central region 42 is transmissive to infrared light, and consequently, as soon as the focussed infrared image in the reflected light beam reaches the center of the mat disk 16, the mirror surface 21 deflects the infrared radiation against the infrared sensor 14 at the right-hand end face of the screen 22.

In this embodiment, it is also of advantage when the inclination of the infrared light reflecting mirror surface 21 is selected as a function of the maximum aperture of the objective 10. For example if the maximum objective aperture is 1 to 1.4, the maximum inclination angle of the mirror surface 21 may be 62°. Inasmuch as the non-mat discontinuity 42 in the mat surface of the disk 16 occupies an area only of $3.5 \cdot 10^{-3}$ mm, it does not interfere with the viewfinder image on the plate 16.

Another difference of the range meter in the reflex camera according to FIG. 8 in comparison to embodiments according to FIGS. 1-4 is the transmission of the infrared light beam from the transmitter through the objective 10 of the camera. In this embodiment, the transmitter is in the form of a laser diode 43 which is fixedly mounted in the camera housing. The swingable viewfinder mirror is provided with an infrared light reflecting mirror 44 which is rigidly connected thereto at an angle at which, during the swung-down position of the mirror 19, the infrared light beam from the transmitter 43 is reflected through an aperture in the mirror 19 to the objective 10 along an optical axis which is deflected about an angle $\epsilon$ from the center axis of the objective. The objective 10 is self-focussing, i.e. in the balanced condition of the rangefinder, the transmitted light beam is directed onto the object to be taken and forms thereon a light spot corresponding to the transmitter, that is to the laser diode 43. This infrared light spot is received through the objective 10 along its center or optical axis and sharply focussed on the infrared image screen 22. If the range finder is not in its balanced condition, that is if the objective is not set to the true distance of the object to be taken, the received infrared light is not coincident with the infrared light transmissive area 42 on the mat plate 16. The misalignment is caused by the deviation $\epsilon$ from the center axis of the objective.

The advantage of this modification of the rangefinder which necessitates the aforedescribed arrangement of the infrared image screen 42 between the mat plate 16 and the pentagonal prism 17 of the viewfinder, resides in the fact that no driven coupling between the objective and the transmitter is required, and also that no special requirements are placed on the directional accuracy of respective optical axes. The arrangement of the transmitter mirror 44 behind the rear surface of the swingable reflex mirror 19 is given by way of an example only and can also be arranged in a different way. According to the position of the laser diode 43, the mirror 44 can be also arranged in front of the swingable reflecting mirror 19. In the latter case, the mirror 44 must be permeable to visible light.

Figure 9:
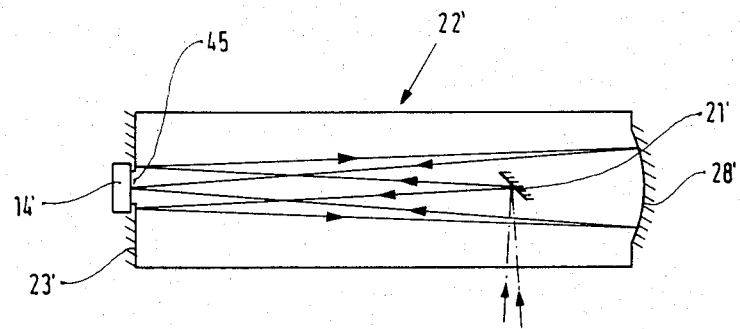
FIG. 9 is a modification of the infrared image screen or plate of FIG. 3.

In the schematic illustration of a modified version of an infrared light screen 22', as illustrated in FIG. 9, the infrared light reflecting mirror surface 21' is inclined towards the end face 23' which adjoins the infrared light sensor 14'. The end face 23' is provided with a window 35 for infrared radiation. The infrared light reflecting surfaces are indicated by hatching. In this modification of the infrared image screen, infrared light rays deflected from the mirror surface 21' are reflected from the mirror surface of the end face 23' and directed onto the concave mirror surface 28' on the opposite end face, and therefrom are again reflected through the window 45 against the infrared light sensor 14'. This multiple reflection of infrared rays is indicated by arrows in FIG. 9. In this embodiment of infrared image screen 22', the infrared sensor 14' can be of a substantially smaller size than that in the embodiment according to FIGS. 2-4.

As mentioned before, the minimum length of the infrared light reflecting mirror surface 21 is computed according to the formula $$l = f \cdot b / p_o.$$

Figure 10:
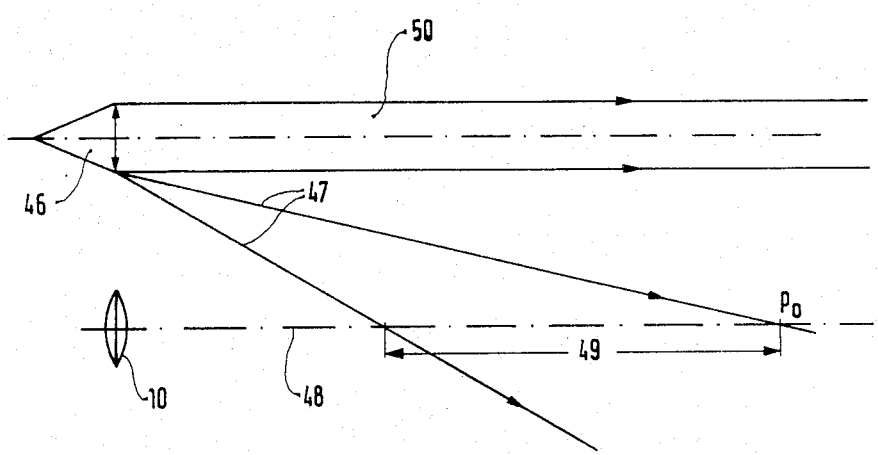
FIG. 10 is a schematic representation of a modification of a rangefinder in the camera of this invention.

If, according to FIG. 10, the infrared light transmitter transmits, apart from a bundle 50 of parallel light rays, an additional diverging light cone 47 which is directed at an angle towards the optical axis 48 of objective 10 to intersect the axis 48 in a region which immediately precedes the shortest focussing distance $p_o$ of the objective 10, then the minimum length of the infrared light reflecting mirror surface 21 can be made substantially shorter than in the preceding embodiments. In the previously described embodiment, when f=50 mm, b=40 mm, then in the case of the shortest focal length of 0.4 meters, the minimum length l of the infrared reflecting surface is 5 mm, and in the case of the shortest focal length being 2 meters, the minimum length of the mirror surface 21 amounts to only 1 mm. In the modification of the transmitted infrared light according to FIG. 10, it is possible, even in the case of the shortest focal length of 0.4 meters, to use an infrared light reflecting mirror surface of a minimum length l=1 mm, inasmuch as an object present in the range 49 is illuminated by the diverging infrared light beam 47, and the returned infrared light passing through the objective reaches the infrared sensor via the shorter infrared light reflecting surface 21. In this manner, the driving motor for the objective adjuster receives the required information for the forward adjustment in the direction corresponding to shorter focal lengths, even if the length of the infrared mirror surface 21 corresponds to the focal length of 2 meters, that is to a distance larger than the actual distance of the object to be photographed.

The generation of the diverging infrared light cone 37 can be effected either by means of a cylindrical prism applied to the transmitter 46, or by applying a converging prism to a lateral part of the bundle 50 of parallel infrared light beams and the deflecting the diverging light cone against the axis of the objective.

It will be understood that each of the elements described above, or two or more together, may also find a useful application in other types of constructions differing from the types described above.

While the invention has been illustrated and described as embodied in a single lens reflex camera for taking still pictures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A reflex camera having an objective adapted for focussing incoming light rays on a film plane, a viewfinder provided with means for deflecting the light rays from the objective on a viewfinder plane and an active rangefinder provided with an infrared transmitter for directing a beam of infrared light on a selected object, an infrared receiver comprising an infrared image plate extending along said viewfinder plane in the path of light rays reflected from said deflecting means, an infrared sensor arranged at a rim portion of said infrared image plate and an infrared light reflecting surface embedded in a portion of said infrared image plate and being inclined thereto at an angle for directing incoming infrared light rays towards said sensor.

2. A camera as defined in claim 1, wherein said infrared image plate extends over the entire viewing field of the viewfinder plane and said infrared sensor immediately adjoins a lateral end face of the infrared image plate.

3. A camera as defined in claim 2, wherein said infrared image plate extends parallel to said viewfinder plane and the angle of inclination of said infrared light reflecting surface is about 45°.

4. A camera as defined in claim 1, wherein said infrared image plate has an elongated rectangular configuration and is divided transversely to its longitudinal side along an inclined separation plane, said infrared light reflecting surface being formed on a portion of an inclined surface in said separation plane and the contact surfaces in said inclined separation plane being united by means of an optically transparent glue.

5. A camera as defined in claim 4, wherein the end face of said infrared image plate opposite the end face provided with said infrared sensor has an arcuate configuration and is provided with infrared light reflecting coating, the radius of curvature of said arcuate end face being adapted for reflecting infrared light against the infrared sensor on the opposite end face.

6. A camera as defined in claim 1, wherein the thickness of said infrared image plate is about 1 mm.

7. A camera as defined in claim 6, wherein said infrared light reflecting surface occupies a rectangular area havin a shorter side in the range between 0.1 and 0.2 mm.

8. A camera as defined in claim 6, wherein said infrared light reflecting surface has an elongated rectangular configuration, the shorter sides of said reflecting surface being inclined at said angle relative to said infrared image plate and having a length between 0.1 and 0.2 mm, and the elongated sides extending parallel to the sides of said infrared image plate and having a length $l=f\cdot b/p_o$, wherein f is the focal length of the objective, b is the distance between the optical axis of the beam of infrared light transmitted by the transmitter and the optical axis of the objective, and $p_o$ is the shortest permissible distance of the object from the objective.

9. A camera as defined in claim 1, wherein said infrared image plate is situated in between said deflecting means and said viewfinder plane and one side of said infrared image plate coinciding with said viewfinder plane.

10. A camera as defined in claim 3, wherein said infrared image plate is situated between said deflecting means and the viewfinder plane, said deflecting means being a mirror having its front reflecting surface facing the objective transmissive to infrared light and a parallel rear surface reflecting the infrared light towards said infrared image plate, and said infrared image plate being spaced a small distance from said viewfinder plane.

11. A camera as defined in claim 10, wherein said parallel rear surface of the deflecting mirror has a convex configuration.

12. A camera as defined in claim 1, wherein said infrared image plate is spaced apart at such a distance from said viewfinder plane that when a sharply focussed visible image is formed on the viewfinder plane a sharply focussed infrared image is simultaneously formed on the infrared image plate.

13. A camera as defined in claim 12, wherein the distance between the viewfinder plane and the infrared image plate is in the order of 0.1 mm.

14. A camera as defined in claim 12, wherein said viewfinder plane is between said infrared image plate and said deflecting means.

15. A camera as defined in claim 14, further comprising a viewfinder plate having a mat surface coinciding with said viewfinder plane, a central region of said mat surface being formed with a non-mat window transmissive to infrared rays and the inclined infrared light reflecting surface in said infrared image plate being situated opposite said window.

16. A camera as defined in claim 5, wherein the end face of said infrared plate adjoining said infrared sensor is provided with an infrared light reflecting coating and said coating having a window opposite said sensor for passing through infrared rays to the latter.

17. A camera as defined in claim 4, wherein the infrared light reflecting surface has a substantially rectangular configuration with sides extending parallel to the sides of said infrared image plate, said parallel sides having a length which is smaller than the length $1 = f \cdot b / p_o$, wherein f is the focal length of the objective, b is the spacing between the optical axis of the beam of infrared light rays transmitted from the transmitter and the optical axis of the objective, and $p_o$ is the shortest permissible distance of the object from the objective, and further comprising means for branching a diverging infrared light cone from said transmitter and directing said light cone against the optical axis of said objective so as to cross the latter before the objective at said point $p_o$.

18. A camera as defined in claim 15, wherein said transmitter transmits infrared light rays against an infrared light reflecting mirror which in turn deflects the infrared light beam through said objective at an angle to the optical axis of the latter.

19. A camera as defined in claim 18, wherein said infrared light reflecting mirror is rigidly connected to said deflecting means.

20. A reflex camera having an objective adapted for focussing incoming light rays on a film plane, a viewfinder provided with means for deflecting the light rays from the objective on a viewfinder plane and an active rangefinder provided with an infrared transmitter for directing a beam of infrared light on a selected object, an infrared receiver comprising an infrared image plate extending along said viewfinder plane in the path of light rays reflected from said deflecting means, an infrared light sensor, said viewfinder including an eyepiece and a pentagonal prism arranged between the eyepiece and the viewfinder plane, a lower front side of said prism opposite said eyepiece being transmissive to infrared light and being provided with a planoconvex lens having its curved surface coated with an infrared light reflecting layer, said infrared light sensor adjoining an opposite side of said prism facing said eyepiece and the radius of curvature of the infrared light reflecting coating of said lens being designed for reflecting light to said sensor.

* * * * *